Feb. 5, 1929.  
H. F. SCHMIDT  
1,701,390  
INTERNAL COMBUSTION ENGINE  
Filed June 24, 1926   3 Sheets-Sheet 1

WITNESSES:

H. F. Schmidt
INVENTOR

BY A. B. Reavis
ATTORNEY

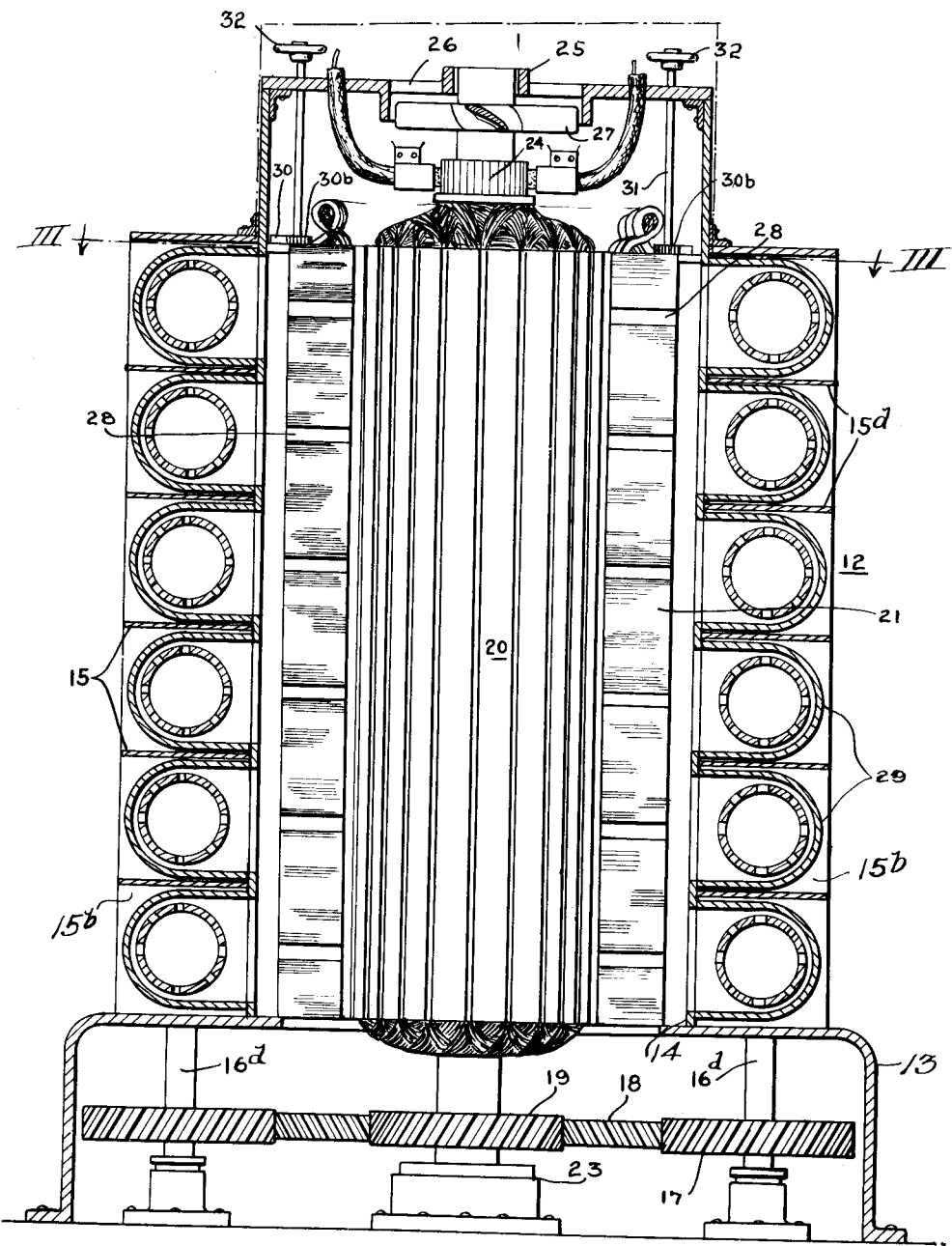

Patented Feb. 5, 1929.

1,701,390

UNITED STATES PATENT OFFICE.

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA.

INTERNAL-COMBUSTION ENGINE.

Application filed June 24, 1926. Serial No. 118,257.

My invention relates to power units embodying internal combustion units and it has for its object apparatus of the character designated which shall be light and compact for the power developed and in which all power cylinders shall be so disposed as to be equally affected as to their operating characteristics by gravity.

A further object of my invention is to provide an internal combustion engine power plant having groups of horizontal cylinders with vertical crank shafts arranged alternately with respect thereto.

A further object of my invention is to provide an internal combustion engine having horizontal cylinders disposed in polygonal formation about a driven machine together with means arranged beneath the engine for transmitting power therefrom to the driven machine.

A further object of my invention is to provide a polygonal frame forming a chamber for air under pressure and adapted to support engine means disposed thereabout, the engine means being provided with scavenge air inlet openings in communication with the chamber.

A further object of my invention is to provide an engine construction embodying a gear enclosing a base member supporting a vertical frame with engine means disposed about and supported by the frame, the engine means being connected to gearing disposed in the base member.

These and other objects are effected by my invention as will be apparent from the following description and the accompanying drawings forming a part of this application.

Figure 1:
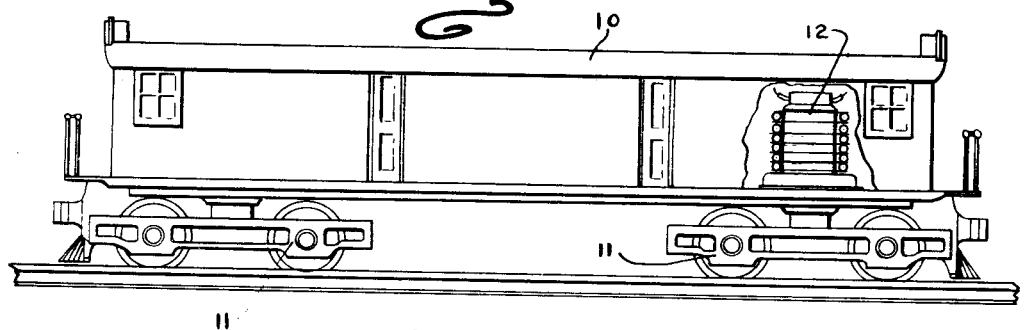

In the accompanying drawings, Fig. 1 is a side view, partially in section and partially in elevation of a locomotive employing power units of the type herein described and claimed. Fig. 2 is a side view partially in section and partially in elevation of one of the power units employed in the organization of Fig. 1, the section being taken along the broken dotted line II—II of Fig. 3.

Figure 3:
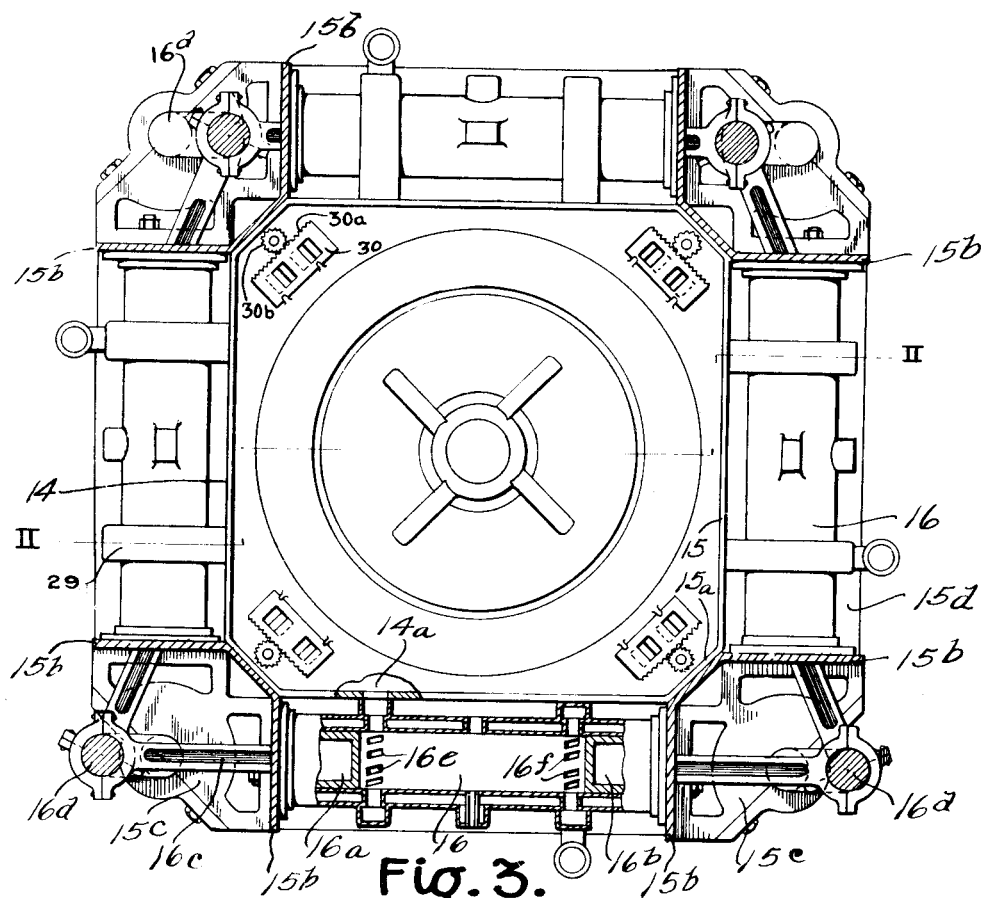
Figure 4:
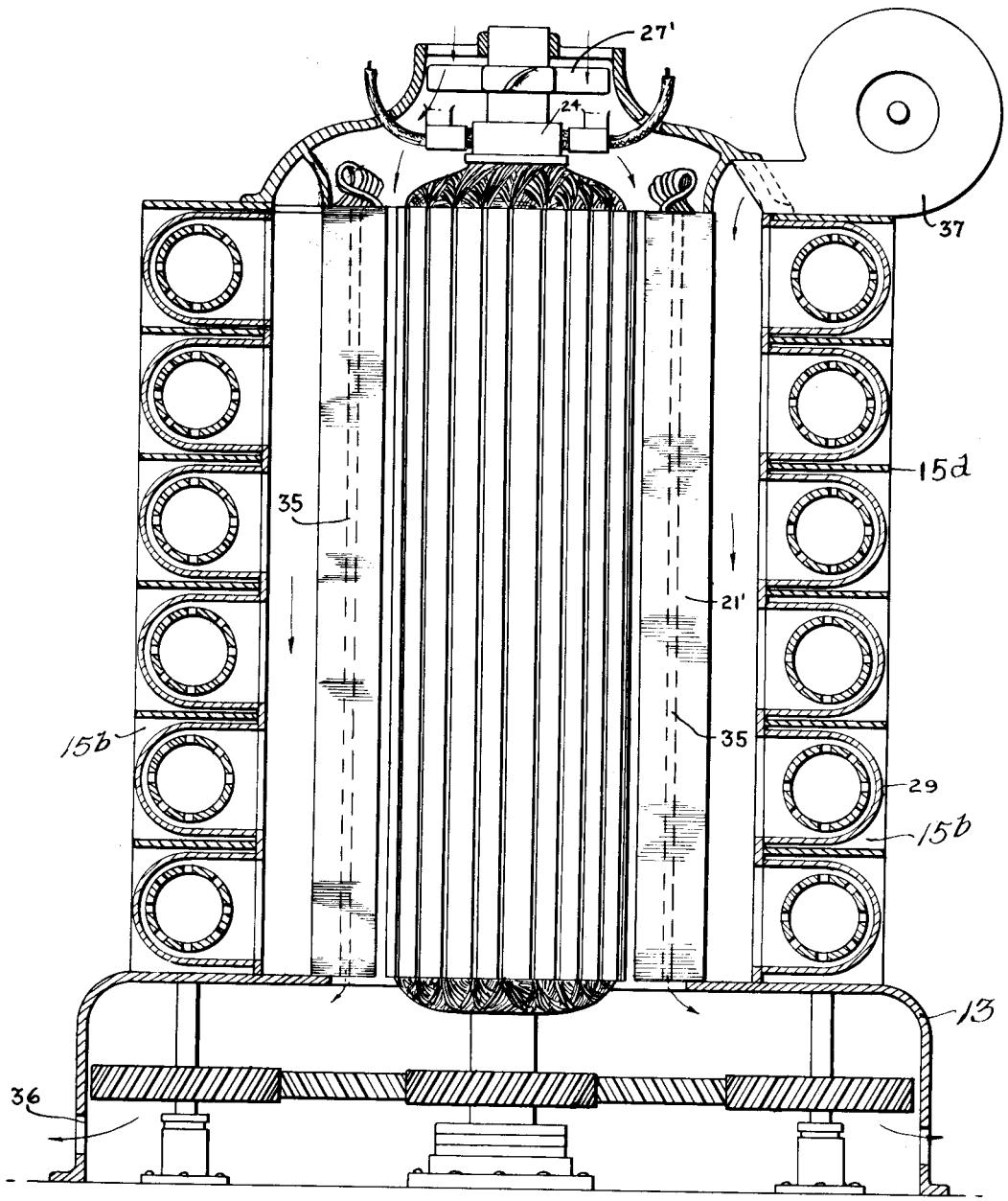

Fig. 3 is a view partially in section and partially in plan with the top plate of the frame removed and taken along the line III—III of Fig. 2 and viewed in the direction of the arrows. Fig. 4 is a view similar to Fig. 2 but showing a modified form.

In a co-pending application of Herbert T. Herr, Serial No. 102,043, filed April 14, 1926, and assigned to the Westinghouse Electric and Manufacturing Company (Case 6510) there is shown and claimed an internal combustion engine of the opposed piston type wherein a plurality of cylinders are grouped to define a polygon and a plurality of such polygonal aggregates are superimposed to build up a complete engine, appropriate crank shafts being disposed at the respective corners of the polygon for the collection of power from the various cylinders.

In the arrangement shown in the aforesaid application, the main axis of the engine is substantially horizontal so that a portion of the cylinders have longitudinal axes disposed horizontally and the remainder vertically. It follows that, under severe operating conditions, there is a different lubricating characteristic for a vertical cylinder than for a horizontal cylinder. In particular, lubricating oil tends to work downwardly from an overhead crank shaft past a downwardly extending piston.

In the engine herein described, the main shaft is disposed substantially vertically with the cylinders arranged therearound, each cylinder being in a horizontal position so that the effect of gravity upon the lubrication of all the cylinders is substantially the same.

It being customary and desirable to drive electric generators by means of engines of the characteristics described, I further provide a generator set within an engine of the aforementioned characteristics, thus making an exceedingly compact unit. In one form of my invention, the cooling air for the generator may be forced through the scavenging ports of the engine, thus still further making for simplicity, compactness, lightness and inexpensive construction.

Referring to the drawing for a more detailed understanding of my invention, I show the cab of a locomotive at 10 in Fig. 1, said locomotive being provided with suitable trucks 11 having propulsion motors thereon which motors are not shown inasmuch as they form no part of my present invention. Preferably, more or less above each truck, there is disposed an internal combustion engine 12 described more in detail in connection with Fig. 2. Within each engine is a generator, and these generators are connected through suitable control equipment to the motors on the trucks 11 for the propulsion of the locomotive.

The framework consists of a base member 13 formed to provide a gearing housing. A polygonal box member or frame 14 is supported by the base member, the frame or box member having vertical side walls 15 joined by gusset portions 15$^a$. Vertical members having flanges 15$^b$ are connected at the corners of the frame or box construction, the flanges being arranged adjacent to the margins of the walls 15 and substantially at right angles to the latter. Crank shaft bearings 15$^c$ are arranged in the angular space between the flange or plate portions 15$^b$ at each corner of the frame. Horizontal plates 15$^d$ extend transversely of each side wall 15 and the ends thereof are connected to the flanges or plates 15$^b$ and to the bearings 15$^c$, as set forth more particularly in the application above referred to.

Engine means of the two-cycle type surrounds and is supported by the polygonal frame or box member 14, the engine means including horizontal cylinders 16 having opposed pistons 16$^a$ and 16$^b$ therein joined by rods 16$^c$ to crank shafts 16$^d$. Each cylinder is provided with scavenge air inlet openings 16$^e$ and with exhaust openings 16$^f$, these openings being covered and uncovered by the pistons 16$^a$ and 16$^b$ during engine operation. The polygonal frame or box member 14 is not only itself a rigid box girder type of construction but it is strengthened by the corner members having the vertical flanges or plates 15$^b$ and also by the horizontal plates or members 15$^d$, the latter acting in tension to resist engine working forces and to hold the structure together more firmly, as pointed out in the application aforesaid.

As may be seen from Fig. 3, the polygonal frame or box member 14 is formed to provide a chamber 14$^a$ for air under pressure. Each cylinder 16 is provided with suitable means 16$^g$ communicating with the chamber 14$^a$ so that, when the inlet openings 16$^e$ are uncovered by a piston 16$^a$, air from the chamber enters the cylinder 16 for scavenging the latter.

As shown in Fig. 3, the engine means consists of alternately arranged cylinders 16 and crank shafts 16$^d$, there being four cylinders in a horizontal group; and, as there are six superposed horizontal groups, the engine illustrated has twenty-four cylinders.

The respective crank shafts are coupled together at the bottom of the engine through suitable gearing 17, 18 and 19 disposed in the base member or housing 13 so that the crank shafts are at all times required to maintain a predetermined angular relation with respect to each other.

An electric generator 20 is disposed within the engine thus described and comprises a field frame 21 with a vertically disposed armature therewithin, the vertical armature shaft carrying the gear 19 and resting in a suitable thrust bearing shown at 23. As shown, the field frame 21 is supported by the base member 13.

At its upper end, the armature 22 carries a commutator 24 with suitable brush leads thereto.

The engine frame is continued up over the commutator 24 as shown and supports a suitable upper bearing 25, and the frame is further arranged, as shown at 26, to define a fan opening in which rotates a suitable fan 27 carried by the armature shaft.

Suitable ventilating openings 28 are provided in the field frame 21 so that the air current set up by the fan 27 passes down through the air gap and radially through the openings 28 for the ventilation of the field frame, thereafter passing to the scavenging ports 16$^e$ for the respective cylinders through suitable hoods 29, providing inlet passages 16$^g$ said arrangement of scavenging hoods being fully shown and claimed in the aforementioned Herr application.

As it may frequently happen that the amount of air which can pass through the air gap would be insufficient for scavenging of the cylinders, I may provide damper members 30 in the upper ends of the box frame, said damper members admitting air directly from the fan 27 to the scavenging ports of the cylinders through the space between the engine frame and the generator field frame. Said dampers are indicated as being adjustable as by having racks 30$^a$ engaged by pinions 30$^b$ at the edge thereof, suitable vertical shafts 31 from the pinions extending through the top of the frame and terminating in suitable hand wheels 32. By this means, a greater or a less portion of the total air supply may be passed directly to the engine.

From the foregoing description, it will appear that, not only are the gears, 17, 18 and 19 rigidly coupled to the crank shafts in predetermined relation, but also that the gear 19 drives the armature of the generator, whereby an extremely light, compact and inexpensive power unit is provided.

In the structure of Figs. 2 and 3, it will be noted that the scavenging air is more or less preheated by being forced to pass through the generator and furthermore it frequently happens that the desirable scavenging pressure is higher than would be desirable for generator cooling. Accordingly, I may arrange the apparatus as shown in Fig. 4 wherein the field frame 21' has no radial ventilating openings therethrough but rather has longitudinal ventilating ducts as indicated in dotted lines at 35. Air from a fan 27' passes down through the air gap and through the ducts 35, being discharged through the base of the engine as indicated at 36. Scavenging air of any desired pressure is provided as by a scavenging blower 37 and it is supplied to the space between the engine frame and the generator frame from which it passes to the scavenging ports of the respective cylinders as before described. Thus, the two systems of air supply are maintained as designated. The scavenging air is not preheated and may be maintained at any desired pressure.

While I have described my invention as including an engine of the square type, it is obvious that any desired even number of cylinders may be disposed about a central axis in the same manner without departing from the spirit of my invention.

It will be noted that the power generator unit thus described is peculiarly adapted to locomotive propulsion as longitudinal space within the cab of a railway vehicle is frequently limited and units of the type herein described may be disposed to occupy the entire width of the cab space for the necessary passage ways and to reach entirely to the roof thereof, thus using the space in an extremely economical manner.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In power plant apparatus, the combination of a vertical frame comprised by wall elements, including vertical wall elements, providing an air chamber, a driven member, two-cycle internal combustion engine means disposed about and supported by the frame and including horizontal cylinders and vertical crank shafts, means including openings provided in said vertical wall elements for supplying scavenging air from the chamber to the cylinders, and means for transmitting power from the crank shafts to the driven member.

2. In power plant apparatus, the combination of a vertical frame providing a scavenge air supply chamber; a driven member; two-cycle internal combustion engine means surrounding the frame and supported thereby and including horizontal cylinders having scavenge air inlet and exhaust openings adjacent to the respective ends thereof, vertical crank shafts, opposed pistons in the cylinders and connected to the crank shafts, and means providing for the passage of air from the chamber to the inlet openings; means for transmitting power from the crank shafts to the driven member, and air translating means operated from the driven member for supplying air to the chamber.

3. In power plant apparatus, the combination of a base member formed to provide a gear housing; a vertical prismatic frame carried by the base member and providing a scavenge air supply chamber; a driven member having a portion disposed within said gear housing; two-cycle internal combustion engine means surrounding the frame and supported thereby and including horizontal cylinders disposed at the vertical faces thereof, each of said cylinders having scavenge air inlet and exhaust outlet openings adjacent the respective ends thereof, vertical crank shafts disposed at the vertical corners of said frame and having the lowermost terminal portions thereof extending into the gear housing, opposed pistons in the cylinders and connected to the crank shafts, and means providing for the passage of air from the chamber to the inlet openings; and spur gearing disposed within the gear housing and interconnecting all of said crank shafts with the driven member.

4. In power developing apparatus, the combination of a vertical tubular member, opposed-piston internal combustion engine means disposed exteriorly about and supported by the tubular member and including horizontal cylinders and vertical crank shafts, and power-transmission means for interconnecting the crank shafts.

5. In power developing apparatus, the combination of a vertical tubular member, pairs of parallel vertical flanges carried by the tubular member, opposed-piston internal combustion engine means surrounding the tubular member and including horizontal cylinders arranged between the flanges of each pair and vertical crank shafts arranged between adjacent pairs of flanges, and power transmission means for interconnecting the crank shafts.

6. In power plant apparatus, the combination of a vertical prismatic box frame provided with a pair of spaced vertical flanges extending outwardly from each vertical side face of the frame, engine means disposed about and carried by the frame and including horizontal cylinders extending between the flanges of each pair and vertical crank shafts at vertical corner regions of the frame and in the angular spaces between adjacent flanges of adjoining pairs, and power transmission mechanism for interconnecting the crank shafts for operation in unison.

7. In power developing apparatus, the combination of a vertical tubular member having means cooperating therewith to provide a scavenging air supply chamber, two-cycle opposed-piston internal combustion engine means disposed exteriorly about and supported by the tubular member and including horizontal cylinders and vertical crank shafts, means for supplying scavenging air from said chamber to each of the cylinders, and power transmission mechanism for interconnecting the crank shafts.

8. In power plant apparatus, the combination of vertically disposed supporting means including vertical side walls providing an interior scavenging air supply chamber; two-cycle, opposed-piston, polyhedral engine means disposed exteriorly of and carried by said supporting means and including horizontal cylinders and vertical crank shafts, the cylinders being disposed transversely of the side walls; means including openings in the side walls providing for the admission of scavenging air from said chamber to the cylinders; and power-transmission means for interconnecting the crank shafts.

9. In power plant apparatus, the combination of a plurality of vertical crank shafts whose axes define corners of a polyhedron, cylinders arranged between the crank shafts and having pistons operatively connected thereto, gearing for interconnecting the crank shafts, a support enclosing the gearing, and vertically-disposed supporting means carried by said support for supporting the cylinders and the crank shafts.

10. In power plant apparatus, the combination of vertically disposed frame means having a supporting base construction, opposed-piston polyhedron engine means including horizontal cylinders and vertical crank shafts carried by the frame means, said frame means being comprised by structure which is independent of the engine means, and power transmission means arranged in said base construction for interconnecting the crank shafts.

11. In power plant apparatus, the combination of a vertical prismatic frame, a gear casing adjacent to one end of the frame, said frame including vertical side faces each of which is provided with a pair of spaced, parallel vertical flanges, engine means supported by the frame and including horizontal cylinders extending between the flanges of each pair and vertical crank shafts at vertical corner regions of the frame and in the angular spaces between adjacent flanges of adjoining pairs and extending into said gear casing, and gearing in the gear casing for interconnecting the crank shafts.

12. In power plant apparatus, the combination of a supporting construction including walls providing scavenging air and gear chambers, engine means disposed about and supported by the construction and including horizontal cylinders and vertical crank shafts, the crank shafts extending into the gear chamber, means providing for the admission of scavenging air from the scavenging air chamber to the cylinders, and gearing in the gear chamber for interconnecting the crank shafts.

13. In power plant apparatus, the combination of a supporting construction including walls providing scavenging air and gear chambers and including a pair of spaced vertical flanges on each vertical side wall portion of the scavenging air chamber; engine means disposed about and supported by the construction and including horizontal cylinders arranged between the flanges of each pair and vertical crank shafts arranged between adjacent pairs of flanges and extending into the gear chamber; means providing for the admission of scavenging air from the scavenging air chamber to the cylinders; and gearing in the gear chamber for interconnecting the crank shafts.

14. In power developing apparatus, the combination of a box-frame construction providing an interior scavenging air chamber, two-cycle polyhedral engine means surrounding the vertical side walls of the construction and carried by the latter and including horizontal cylinders disposed transversely of the side walls, mechanism including means for interconnecting the crank shafts, air translating means operated from said mechanism for supplying air through the top wall of said construction to the chamber, and means for supplying air from the chamber to the cylinders.

15. In power plant apparatus, the combination of a supporting construction including walls providing scavenging air and gear chambers, engine means disposed about and supported by the construction and including horizontal cylinders and vertical crank shafts, the crank shafts extending into the gear chamber, means providing for the admission of scavenging air from the scavenging air chamber to the cylinders, driven mechanism including gearing arranged in said gear chamber for interconnecting the crank shafts, and a blower supported by said construction and operated by said mechanism for supplying air to the scavenging chamber.

16. In power plant apparatus, the combination of a supporting construction including walls providing scavenging air and gear chambers and including a pair of spaced vertical flanges on each vertical side wall portion of the scavenging air supply chamber; engine means disposed about and supported by the construction and including horizontal cylinders arranged between the flanges of each pair and vertical crank shafts arranged between adjacent pairs of flanges and extending into the gear chamber; means providing for the admission of scavenging air from the scavenging air chamber to said cylinders; driven mechanism including gearing arranged in said gear chamber for interconnecting the crank shafts; and a blower supported by said construction and operated by said mechanism for supplying air to the scavenging chamber.

17. In power plant apparatus, the combination of a vertical prismatic frame structure embodying vertical wall elements, horizontal cylinders disposed transversely of said vertical wall elements and supported by said structure, a vertical crank shaft at each vertical corner of said structure and supported by the latter, opposed pistons in the cylinders and connected to the crank shafts, and transmission means for interconnecting the crank shafts.

18. In power plant apparatus, the combination of engine means including a plurality of horizontal side cylinders and a plurality of vertical corner crank shafts arranged to define a polyhedron, a vertical frame comprised by structure which is independent of the engine means and extending within the polyhedron, means provided on the frame for supporting the cylinders and the crank shafts, and transmission means for interconnecting the crank shafts.

19. In power plant apparatus, the combination of a plurality of horizontal cylinders and a plurality of vertical corner crank shafts arranged to define a polyhedron, a vertical frame extending within the polyhedron, means provided on the frame for supporting the cylinders and the crank shafts and including cylinder-end embracing means for adjacent cylinder ends with crank shaft bearings interposed therebetween, and transmission means for interconnecting the crank shafts.

20. In an engine, the combination of a plurality of horizontal side cylinders and a plurality of vertical corner crank shafts arranged to define a polyhedron, a vertical frame extending within said polyhedron and providing within the latter a chamber for gaseous media, means provided on the frame for supporting the cylinders and the crank shafts, means for supplying gaseous media from the chamber to the cylinders, and transmission means for interconnecting the crank shafts.

21. In an engine, the combination of a plurality of cylinders and crank shafts arranged to define a polyhedron, a frame extending within the polyhedron and providing within the latter a chamber for gaseous media, means provided on the frame for supporting the cylinders and the crank shafts, means for supplying gaseous media from the chamber to the cylinders, transmission means for interconnecting the crank shafts, and translating means driven from said transmission means for supplying gaseous media to the chamber.

22. In an engine, the combination of a plurality of cylinders and crank shafts arranged to define a polyhedron, a frame extending within the polyhedron and providing within the latter a chamber for gaseous media, means provided on the frame for supporting the cylinders and the crank shafts, means for supplying gaseous media from the chamber to the cylinders, transmission means for interconnecting the crank shafts, a blower carried by the frame for supplying gaseous media to the chamber, and means driven from the transmission means for operating the blower.

23. In power plant apparatus, the combination of a polyhedral engine arrangement including horizontal side cylinders and vertical corner crank shafts, a polyhedral frame extending within the arrangement and including side walls transversely of which said cylinders are disposed, crank shaft bearings carried by the frame at vertical corners thereof, means carried by the frame adjacent to vertical margins of said side walls for supporting the cylinder ends, and transmission means for interconnecting the crank shafts.

24. In an engine, the combination of a plurality of cylinders and crank shafts, each of the cylinders having admission openings for gaseous media, means for retaining the cylinders and crank shafts in the form of a polyhedron with the crank shafts at parallel corners thereof, transmission mechanism for interconnecting the crank shafts, translating means for gaseous media operated from the engine, a storage reservoir arranged within the polyhedron and supplied by the translating means, and means for supplying gaseous media from the reservoir to the cylinder admission openings.

In testimony whereof, I have hereunto subscribed my name this eighteenth day of June, 1926.

HENRY F. SCHMIDT.